US 6,568,712 B1

(12) United States Patent
Aaron, III (10) Patent No.: US 6,568,712 B1
(45) Date of Patent: May 27, 2003

(54) ALIGNMENT TOOL FOR PIPE COUPLINGS (76) Inventor: John W. Aaron, III, 13330 Scamp Dr., Cypress, TX (US) 77429

( * ) Notice: Subject to any disclaimer, the term of this patent is extended or adjusted under 35 U.S.C. 154(b) by 0 days.

(21) Appl. No.: 09/596,504

(22) Filed: Jun. 19, 2000

(51) Int. Cl.⁷ ............................................... F16L 35/00
(52) U.S. Cl. .......................... 285/24; 29/272; 29/468
(58) Field of Search ........................ 285/24, 27; 403/13; 405/170; 29/237, 272, 281.4, 281.5, 464, 468; 228/49.3; 248/49.3; 269/43, 44

(56) References Cited

U.S. PATENT DOCUMENTS

| | | | | |
|---|---|---|---|---|
| 820,126 | A | * 5/1906 | Phillips | 285/27 X |
| 2,467,416 | A | * 4/1949 | Worel | 384/538 |
| 3,898,714 | A | * 8/1975 | McFadden | 269/43 X |
| 3,979,814 | A | * 9/1976 | Lajoi et al. | 29/272 |
| 4,016,637 | A | 4/1977 | Swensen | |
| 4,175,735 | A | 11/1979 | Griffin | |
| 4,315,702 | A | 2/1982 | Moe et al. | |
| 4,467,955 | A | * 8/1984 | Maupin, Jr. | 228/49.3 X |
| 4,555,841 | A | 12/1985 | James | |
| 4,697,777 | A | * 10/1987 | Yang | 248/544 X |
| 5,004,017 | A | * 4/1991 | White | 285/24 X |
| 5,226,231 | A | 7/1993 | De Leebeeck | |
| 5,407,183 | A | * 4/1995 | Singeltary | 269/43 |
| 5,520,419 | A | * 5/1996 | DeBoalt et al. | 285/24 |
| 5,560,091 | A | * 10/1996 | Labit, Jr. | 29/272 |
| 5,799,408 | A | * 9/1998 | Sprayberry | 29/468 X |
| 6,327,763 | B2 | * 12/2001 | Stephen | 29/272 |

FOREIGN PATENT DOCUMENTS

| | | | | |
|---|---|---|---|---|
| CA | 1046250 | * | 1/1979 | 29/272 |
| SU | 382800 | * | 5/1973 | 285/27 |

* cited by examiner

Primary Examiner—Greg Binda
(74) Attorney, Agent, or Firm—Gray Cary Ware & Freidenrich, LLP (57) ABSTRACT

An alignment tool configured to be coupled to a first flange, the alignment tool having an alignment guide extending outward from the periphery of the first flange at an angle of between 0 and 90 degrees from the axis of the first flange. A plurality of such alignment guides are coupled to the first flange so that a second flange which is positioned off-axis from the first flange, but between the alignment guides of the alignment tools will be constrained to move toward an on-axis position as the second flange approaches the first flange. In one embodiment, one or more of the alignment tools includes at least one alignment pin which extends through a bolt hole of the first flange and beyond the face of the flange so that the alignment pin can engage one of the bolt holes of the second flange and thereby maintain rotational alignment of the flanges. In one embodiment, the alignment pin comprises a spring-loaded, telescoping pin which, when the flanges are not rotationally aligned, is compressed and does not extend beyond the face of the first flange, and when the flanges are rotationally aligned, extends beyond the face of the first flange to engage a bolt hole of the second flange.

9 Claims, 7 Drawing Sheets

ALIGNMENT TOOL FOR PIPE COUPLINGS

BACKGROUND OF THE INVENTION

1. Field of the Invention

The invention relates generally to pipelines and more particularly to a system and method for automatically guiding a pair of pipe sections into alignment so that the flanges at the end of the pipe sections can be secured together.

2. Related Art

Pipelines are commonly used to transport oil and other hydrocarbons. Because of the enormous quantities of oil and/or hydrocarbons which need to be transported in this manner, the pipelines typically have relatively large diameters and correspondingly thick walls.

Pipelines of this type are typically constructed by coupling a series of pipe segments, or sections, together to form a single conduit. Often, the pipe sections include a flange at each end which can be coupled to a similar flange of another pipe section. For example, the pipe sections may utilize standard ANSI flanges which are aligned and then bolted together.

Because of the scale of these pipelines, it may be very difficult to align the flanges of adjoining pipe sections so that they can be bolted together. Often, a worker is required to assist in the coupling of two pipe sections by manually guiding the pipe sections together so that they are properly aligned. This can be extremely dangerous because of the weight of the pipe sections, and the worker could easily be injured, or even killed.

SUMMARY OF THE INVENTION

One or more of the problems outlined above may be solved by the various embodiments of the invention. Broadly speaking, the invention comprises an alignment tool for guiding two pipe flanges into alignment so they can be secured together, as well as systems and methods for using the alignment tool.

In one embodiment, the alignment tool comprises an alignment guide connected to an attachment body. The alignment guide, when attached to a pipe flange, extends outward from the periphery of the flange at an angle which is about 45 degrees from the axis of the flange. The alignment tool has a pair of alignment pins which are configured to be positioned in the bolt holes of the flange. In one embodiment, the alignment tool includes several set screws which are opposed to the alignment pins. When tightened, the set screws contact the outer edge of the flange and secure the flange against the alignment pins. One or more of the alignment pins which extend through bolt holes of the first flange and beyond the face of the flange so that they can engage one of the bolt holes of a second flange and thereby maintain rotational alignment of the flanges. The alignment pin may comprise a spring-loaded, telescoping pin which, when the flanges are not rotationally aligned, is compressed and does not extend beyond the face of the first flange, and when the flanges are rotationally aligned, extends beyond the face of the first flange to engage a bolt hole of the second flange.

In another embodiment, a system comprises a first flange and a plurality of alignment tools coupled to the first flange. Each of the alignment tools has an alignment guide extending axially forward and radially outward from the periphery of the first flange. The alignment tools constrain the movement of the second flange toward a position which is aligned with the first flange as the second flange becomes closer to the first flange.

In another embodiment, a method comprises attaching a plurality of alignment tools to a first flange so that the alignment guides of the tools extends radially outward and axially forward from the first flange. A second flange is positioned between the alignment guides and moved generally toward the first flange. As the second flange approaches the first flange, the alignment guides force the second flange to move toward an aligned position with respect to the first flange. When the second flange comes into contact with the first flange and/or the alignment pins extending through the first flange, the second flange is rotated until the alignment pins engage the bolt holes of the second flange and prevent it from rotating further. The flanges are now aligned both axially and rotationally. The first and second flanges are then maintained in aligned positions by installing bolts in one or more of the corresponding bolt holes of the flanges. After the alignment tools are removed, the remainder of the bolts can be installed in the flanges and tightened to secure the coupled flanges.

BRIEF DESCRIPTION OF THE DRAWINGS

Other objects and advantages of the invention may become apparent upon reading the following detailed description and upon reference to the accompanying drawings in which.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the spirit and scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Figure 1:
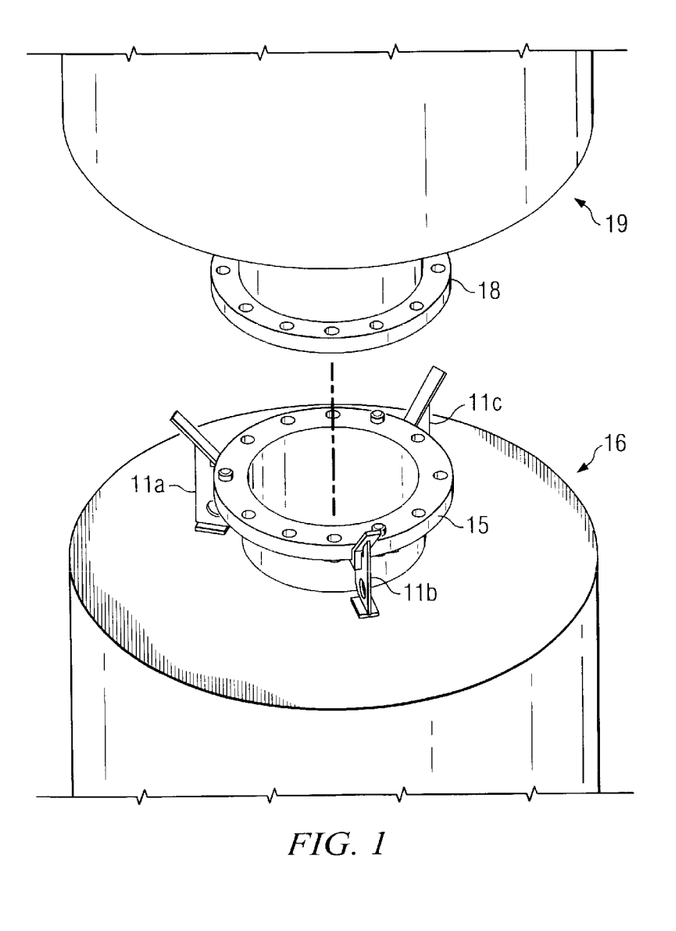
FIG. 1 is a perspective view of the alignment tools coupled to the flange of a buoyancy-can-equipped pipe section in one embodiment.

Referring to FIG. 1, a perspective view of the alignment tools in one embodiment is shown. In this embodiment, two pipe sections 16, 19 are configured to be coupled together. The pipe sections in this embodiment are designed for sub-sea use. The body of each pipe section appears to be substantially larger than the coupling flanges 15, 18 because a large-diameter buoyancy can is installed around each of the pipe sections, as will be described in more detail below. The alignment tools are particularly useful in this situation because of the additional difficulties and dangers arising from working in a submarine environment.

Pipe sections 16 and 19 are coupled to each other by bolting corresponding flanges 15, 18 together. This requires that the flanges be aligned, both axially and rotationally. Put another way, the pipe sections must be oriented so that the pipe openings themselves are aligned, and so that all the bolt holes in the flanges are also aligned. If the pipe sections are not properly oriented, bolts cannot be inserted into the holes and the pipe sections cannot be secured.

In this embodiment, three alignment tools 11a, 11b, 11c are coupled to flange 15 of pipe section 16. In other embodiments, more alignment tools can be used, but less than three is not recommended. Alignment tools 11 should be spaced as evenly as possible around the periphery of flange 15 (the spacing will depend in part on the number of bolt holes in the flanges, so it may not be exactly even). Alignment tools 11 extend both axially forward from pipe section 16 (in the direction of the axis of pipe section 16) and radially outward from the axis of the pipe section. Alignment tools 11 thereby effectively define a generally conic section which has a diameter at the face of flange 15 which is equal to the diameter of flanges 15 and 18. (The term "conic section" is used here to refer generally to a space which tapers from a wider area to a more narrow area, rather than a mathematically defined conic section.) The conic section broadens as it extends away from flange 15, effectively providing a larger area within which flange 18 can be positioned for successful mating with flange 15.

It should be noted that multiple instances of an item may be indicated herein by a single reference numeral followed by a letter. For example, alignment tools 11a, 11b and 11c are separate, but identical items. Multiple instances of an item may be referred to collectively herein by the reference numeral without the letter.

As pipe section 19 is moved toward pipe section 16, alignment tools 11 keep flange 18 within the defined conic section. As flange 18 comes closer to flange 15, the diameter of the conic section decreases, forcing the flanges into axial alignment. In other words, the centers of the flange faces will be coincident. It is assumed here that the pipe sections begin in approximately aligned positions—while the pipe sections may not be exactly coaxial, they are sufficiently close to coaxial positions that the flanges can be bolted together if the bolt holes are aligned.

Figure 2:
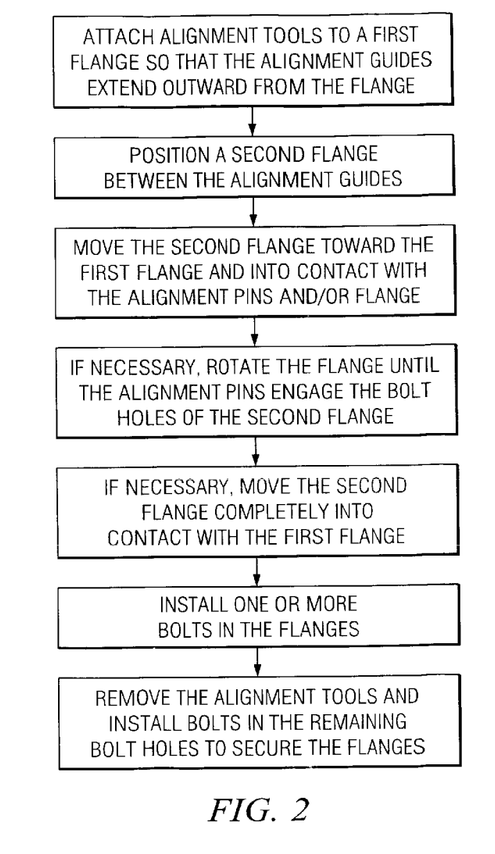
FIG. 2 is a flow diagram illustrating a method for coupling a pair of pipe flanges using the alignment tools in one embodiment.

In order to align the flanges rotationally (i.e., align the bolt holes on the two flanges), each of the alignment tools in this embodiment incorporates a spring-loaded, telescoping alignment pin which extends through one of the bolt holes of flange 15. If flanges 15 and 18 are in contact, but the bolts holes are not aligned, the telescoping pins will be compressed and generally will not extend beyond the face of flange 15. If the flanges are in contact with each other and the bolt holes are aligned, the telescoping pins will extend through the bolt holes of flange 15 and into the corresponding bolt holes of flange 18. Thus, when the flanges are axially aligned, the pipe sections can be rotated until the bolt holes are aligned, at which point the telescoping pins will extend into flange 18 to maintain the rotational alignment of the flanges. Referring to FIG. 2, a flow diagram illustrating the method for coupling the flanges as described above is shown.

Figure 3:
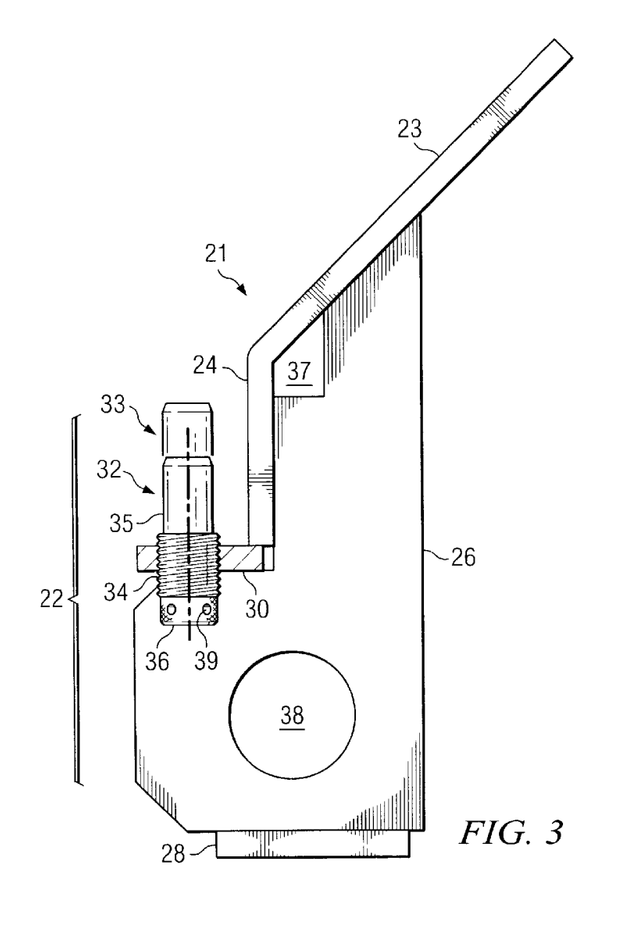
FIG. 3 is a plan view of an alignment tool configured to be installed on the flange of a buoyancy-can-equipped pipe section in one embodiment.
Figure 4:
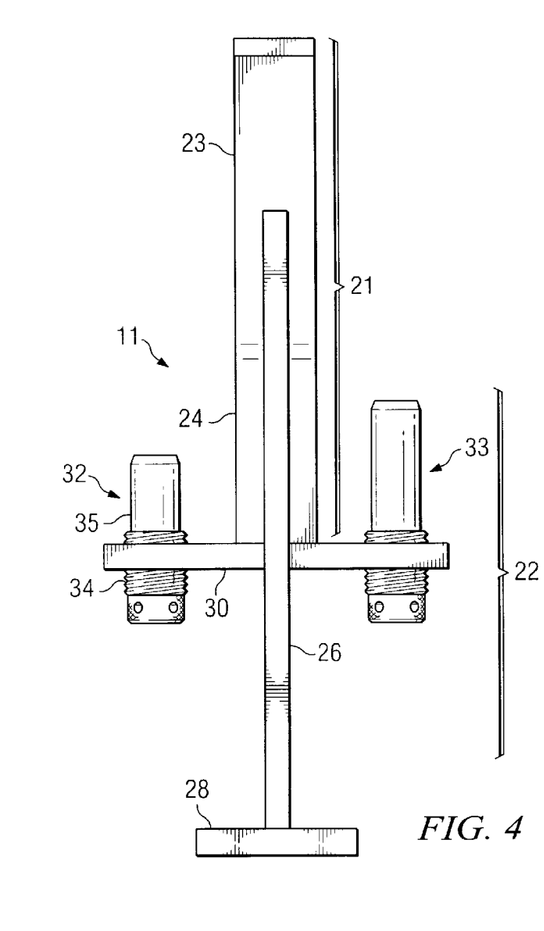
FIG. 4 is a second plan view of the alignment tool illustrated in FIG. 3.

Referring to FIGS. 3 and 4, alignment tool 11 is shown in more detail. (It should be noted that alignment tool 11 is specifically designed to be used with the buoyancy can pipe sections illustrated in FIG. 1, and that other embodiments may be modified to be used with other types of pipe sections and flanges.) Alignment tool 11 can be considered to comprise two main parts: an alignment guide 21 and an attachment body 22. (In this embodiment, these two parts are integral to alignment tool 11—that they are treated individually here only to facilitate the description of the tool.) The purpose of attachment body 22 is to hold alignment tool 11 in position near the face of a first flange. The purpose of alignment guide 21 is to guide a second flange into a position which is in alignment with the first flange.

Figure 5:
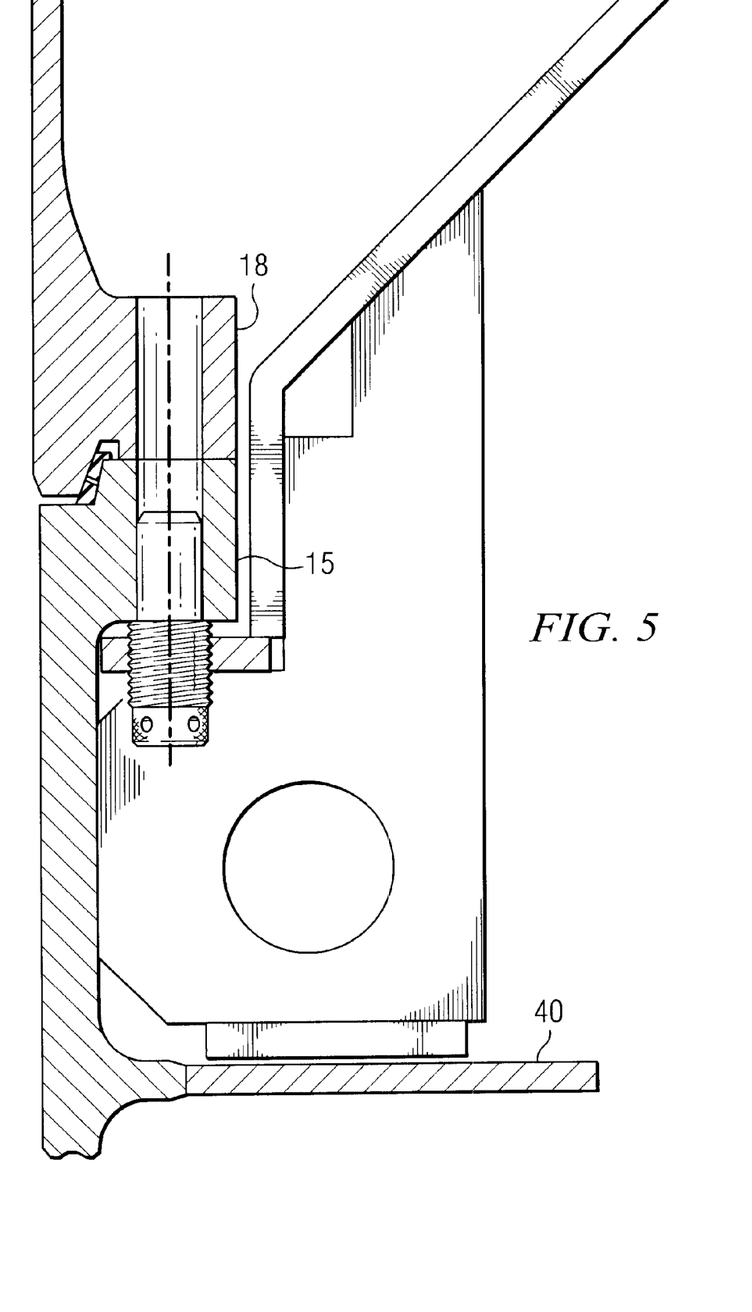
FIG. 5 is a plan view of the alignment tool illustrated in FIG. 3 installed on the flange of a buoyancy-can-equipped pipe section.

Referring to FIG. 5, alignment tool 11 is shown in its installed position on a first flange 15. It can be seen in this figure that alignment guide 21 generally extends radially outward and axially forward from the periphery of the first flange. "Radially" and "axially" here refer to directions with respect to the axis of the first flange, so "radially outward" in FIG. 5 is to the right of the figure and "axially forward" is upward in the figure.

In the embodiment illustrated in FIGS. 3–5, only a first portion 23 of alignment guide 21 extends radially outward from the first flange. Alignment guide 21 also has a second portion 24 which only extends axially forward—it does not extend radially outward. While the purpose of first portion 23 of alignment guide 21 is to urge the second flange into an aligned position, the purpose of second portion 24 of alignment guide 21 is to allow the second flange to move coaxially with the first flange to make contact with the first flange. This axial movement facilitates the engagement of alignment pin 33 with the bolt holes of the second flange, as will be described more fully below. It should be noted that, while the use of second portion 24 of alignment guide 21 is preferred, it is not required.

In the embodiment shown in FIGS. 3–5, the first portion 23 of alignment guide 21 is positioned at an angle of approximately 45 degrees from the axis of the pipe section and flange. It should be noted that the angle of first portion 23 from the pipe section's axis may vary from one embodiment to another. Larger angles will provide a larger target for the second flange. That is, the second flange may be further off axis from the first flange, yet still be positioned between the alignment guides of the plurality of alignment tools installed on the first flange so that the second flange can be guided into alignment with the first flange. If the angle is too large, however, the radially inward force resulting from the contact between the second flange and the alignment guides may not be sufficient to force the second flange back into an aligned position. Smaller angles will allow the second flange to slide more easily into an aligned position, but will present a smaller target for the second flange (assuming the length of the alignment guides is the same.) It is contemplated that the optimal angle of first portion 23 of alignment guide 21 may vary from implementation to implementation and, in most cases, will fall somewhere in the range from 30 to 60 degrees (although more extreme angles are possible).

Alignment guide 21 and attachment body 22 are connected via central plate 26. (As noted above, alignment guide 21 and attachment body 22 are not physically separate items, but are treated separately to facilitate their description.) A rigid structure other than a plate may be used in other embodiments. In this embodiment, alignment guide 21 is comprises a bar which is bent to form first and second portions 23 and 24. The bar is then welded to central plate 26. Central plate 26 also forms the central structure of attachment body 22. Connected to central plate 26 are a base plate 28, and apin plate 30. A pair of alignment pins 32, 33 are connected to the pin plate.

As shown in FIG. 3, central plate 26 has two apertures therethrough. The first aperture is a lifting hole 37. Lifting hole 37 provides a means to attach a cable to alignment tool 11 so that it can be lifted. Lifting hole 37 is positioned above the center of gravity of alignment tool 11 so that when the tool is lifted, it will maintain its upright orientation. (This embodiment is designed for vertical pipelines, so the upright position illustrated in the figures is the proper orientation for installation of the tool on the pipe sections.) The second aperture through central plate 26 is a lightening hole 38. Very simply, the purpose of this hole is to eliminate a portion of the mass of alignment tool 11 and thereby reduce its weight. The reduction in the tool's weight makes the tool easier to handle.

As noted above, alignment tool 11 is designed to be used with pipe sections having buoyancy cans. Referring again to FIG. 5, alignment tool 11 is designed to be installed in the gap between flange 15 and wall 40 of the buoyancy can. Base plate 28 is welded to central plate 26 to provide a contact surface to abut buoyancy can wall 40. Pin plate 30 is positioned to abut flange 15 and is also welded to central plate 26. The abutment of base plate 28 and pin plate 30 against buoyancy can wall 40 and flange 15 help to maintain the proper orientation of alignment tool 11 during installation. Alignment pins 32 and 33 are removably installed in apertures through pin plate 30. The alignment pins are installed in pin plate 30 after alignment tool 11 is positioned between flange 15 and buoyancy can wall 40. Since the alignment pins extend through pin plate 30 and into the bolt holes of flange 15, they serve to hold alignment tool 11 in position. (It should be noted that this embodiment of the alignment tool is intended for use with buoyancy can-equipped pipe sections, and that other embodiments of the tool may vary.)

As shown in FIGS. 3—5, alignment pins 32 and 33 include a threaded portion 34 and a narrower portion 35 that extends into one of the bolt holes of the flange. Alignment pins 32 and 33 may have a knurled portion 36 to allow them to be more easily threaded by hand. The alignment pins may also include holes 39 into which a tommy bar can be inserted to turn the pins. Threaded portion 34 has a larger diameter than the bolt hole, so as the alignment pin is threaded through the aperture in pin plate 30, it extends above pin plate 30 and comes into contact with the back of flange 15. As the pin is threaded further into the aperture, it is tightened against flange 15, thereby securing alignment tool 11 between flange 15 and buoyancy can wall 40.

It can be seen in FIGS. 3 and 4 that alignment pin 32 is shorter than alignment pin 33. In the illustrated embodiment, pin 32 does not extend all the way through the bolt hole into which it is inserted. In other words, the length of narrow portion 35 is less than the thickness of flange 15. Alignment pin 33, on the other hand, has a narrow portion which extends beyond the face of flange 15. That is, the length of the narrow portion is greater than the thickness of flange 15. Because alignment pin 33 extends beyond the face of flange 15, the pin can engage flange 18 when the bolt holes of the two flanges are aligned. This is illustrated in FIGS. 6 and 7.

Figure 6:
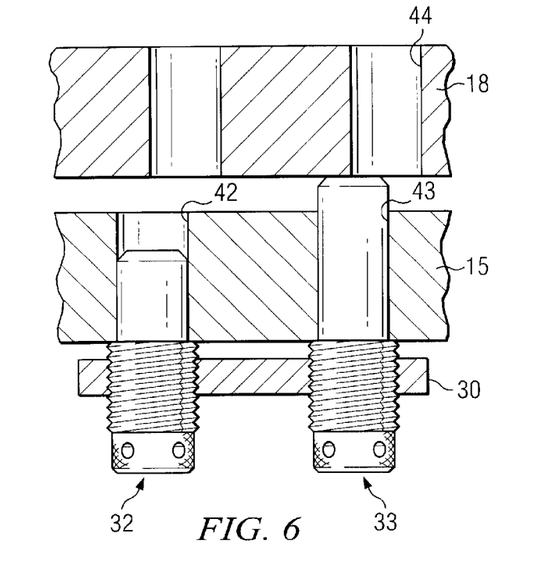
FIG. 6 is an illustration of the contact between a second flange and an alignment pin in one embodiment when the bolt holes of the second flange are not aligned with the bolt holes of a first flange.
Figure 7:
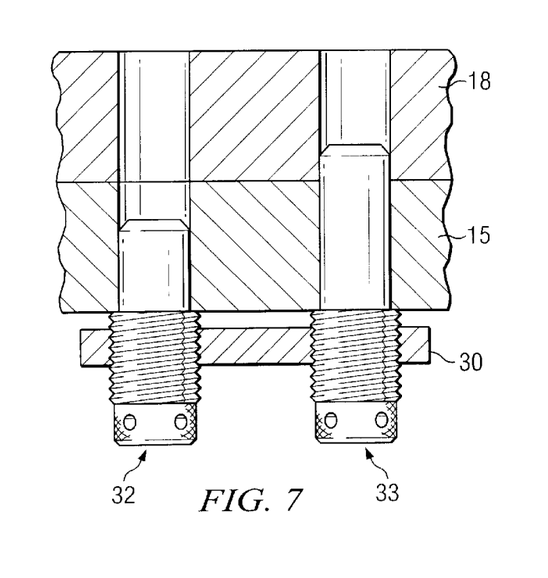
FIG. 7 is an illustration of the contact between the two flanges shown in FIG. 6 when the bolt holes of the flanges are aligned with each other.

In FIGS. 6 and 7 alignment pins 32 and 33 are shown in an installed position with respect to flange 15. Alignment pin 32 extends partially through bolt hole 42, while alignment pin 33 extends completely through bolt hole 43 and above the face of flange 15. In FIG. 6, the bolt holes of flanges 15 and 18 are not aligned. Consequently, flange 18 cannot be fully seated against flange 15. As flange 18 is rotated it will approach an orientation in which its bolts holes will become aligned with those of flange 15 as shown in FIG. 7. When the bolt holes are aligned, alignment pin 33 will enter the corresponding bolt hole 44 of flange 18 and the flanges can be fully seated against each other. Because the bolt hole patterns of the flanges are the same, the alignment of holes 43 and 44 ensures that all of the other bolt holes are also aligned. The flanges can then be bolted together.

It should be noted that, once several bolts have been used to secure flanges 15 and 18, alignment tool 11 can easily be removed. Alignment pins 32 and 33 are simply unscrewed and removed from pin plate 30. Alignment tool 11 can then be slid out from between flange 15 and buoyancy can 40. Bolts can then be inserted into the remaining holes (including those previously occupied by alignment pins 32 and 33) and secured to complete the coupling.

Figure 8:
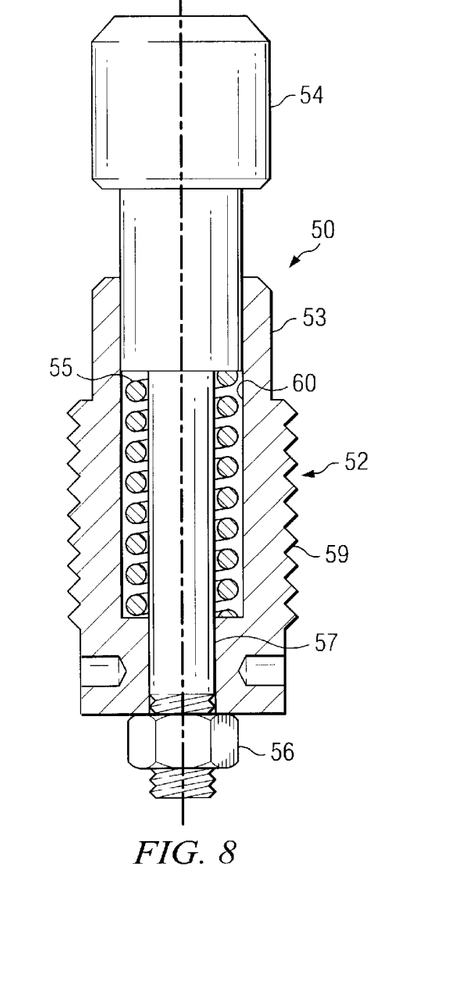
FIG. 8 is a partial cross-sectional view of a spring-loaded, telescoping alignment pin used in one embodiment.

In an alternate embodiment, one or more of the alignment pins may comprise a spring-loaded pin instead of a solid pin. Referring to FIG. 8, a partial cross-section of a spring-loaded in 50 is shown. Spring-loaded pin 50 has a main body 52 and a movable, telescoping extension 54. Main body 52 is very similar to the body of alignment pin 33 in that it has a threaded portion 59 which is configured to be threaded into pin plate 30 and a narrow portion 53 which is configured to fit within a pair of bolt holes in flanges 15 and 18. Spring-loaded pin 50 differs from alignment pin 33 in that it has a recess 60 in which extension 54 is disposed. Recess 60 also accommodates a spring 55 which urges extension 54 outward from the recess. Extension 54 is connected to a threaded shaft 57 which that extends through main body 52 and is secured by a nut 56 to prevent shaft 57 and extension 54 from being removed from recess 60.

Spring-loaded pin 50 is installed in alignment tool 11 in the same manner as alignment pins 32 and 33. When alignment tool 11 is installed on flange 15, spring-loaded pin 50 is threaded into pin plate 50. Narrow portion 53 extends into one of the bolt holes of flange 15 and secures alignment tool 11 against the flange. Spring-loaded pin 50 initially extends above the face of flange 15 in the same manner as alignment pin 33 but, when flange 18 is moved into contact with flange 15, spring-loaded pin 50 can be compressed so that it does not extend beyond the face of the flange.

Figure 9:
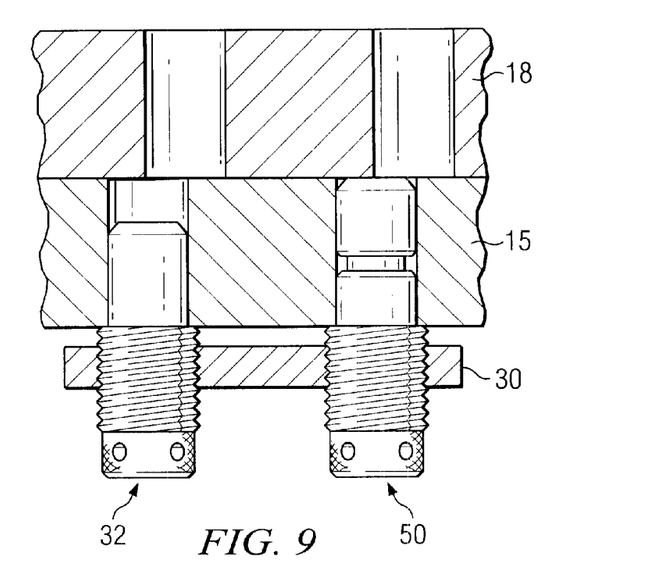
FIG. 9 is an illustration of the contact between two flanges and the compression of a telescoping alignment pin in one embodiment when the bolt holes of the second flange are not aligned with the bolt holes of the first flange.
Figure 10:
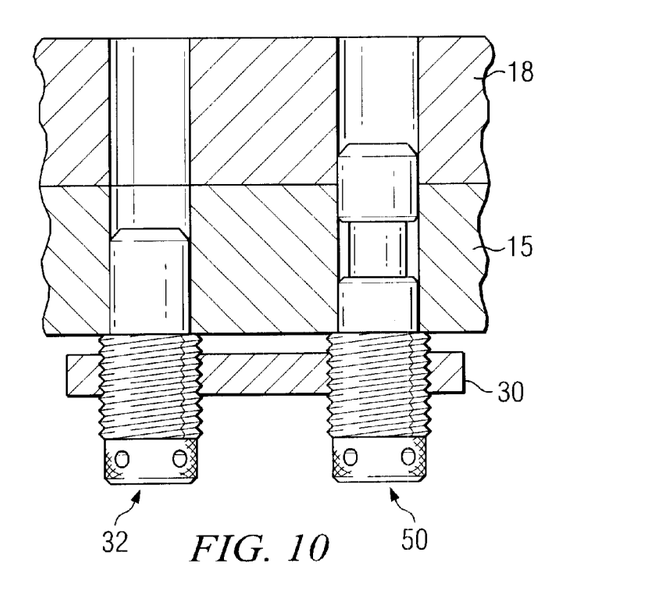
FIG. 10 is an illustration of the contact between the two flanges shown in FIG. 9 when the bolt holes of the flanges are aligned with each other.

The operation of spring-loaded pin 50 is illustrated in FIGS. 9 and 10. As shown in FIG. 9, when flange 18 is brought into contact with flange 15, but the bolt holes of the flanges are not aligned, spring-loaded pin 50 is compressed (i.e., extension 54 is forced into a retracted position within recess 60 and spring 55 is compressed). When flange 18 is rotated with respect to flange 15, the bolt holes move toward aligned positions. When the bolt holes become aligned, as shown in FIG. 10, extension 54 moves to an extended position in which it is partially inserted into one of the bolt holes of flange 18. The flanges can then be bolted together as described above.

Figure 11:
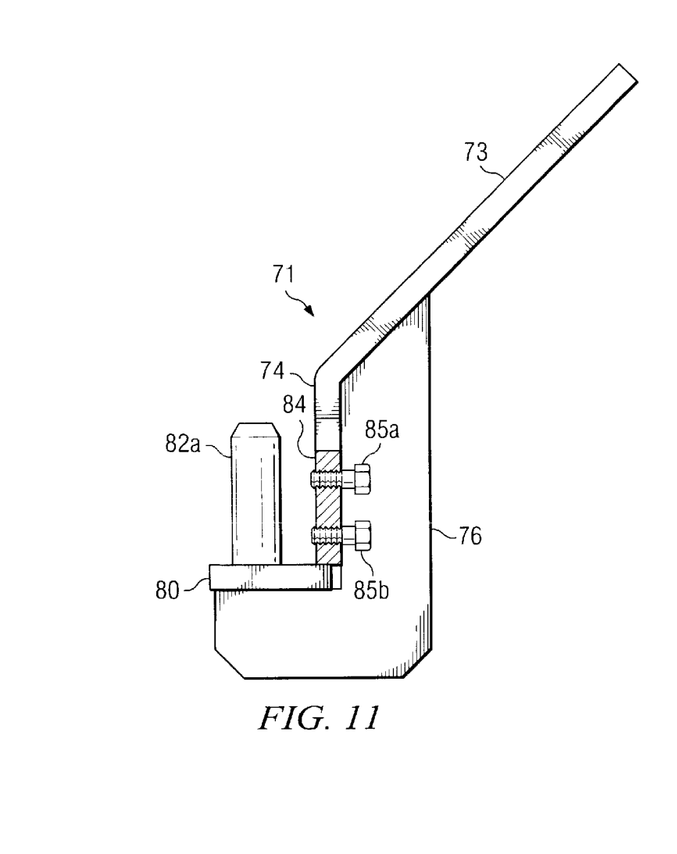
FIG. 11 is a plan view of an alignment tool configured to be installed on a flange using alignment pins and corresponding set screws in one embodiment.
Figure 12:
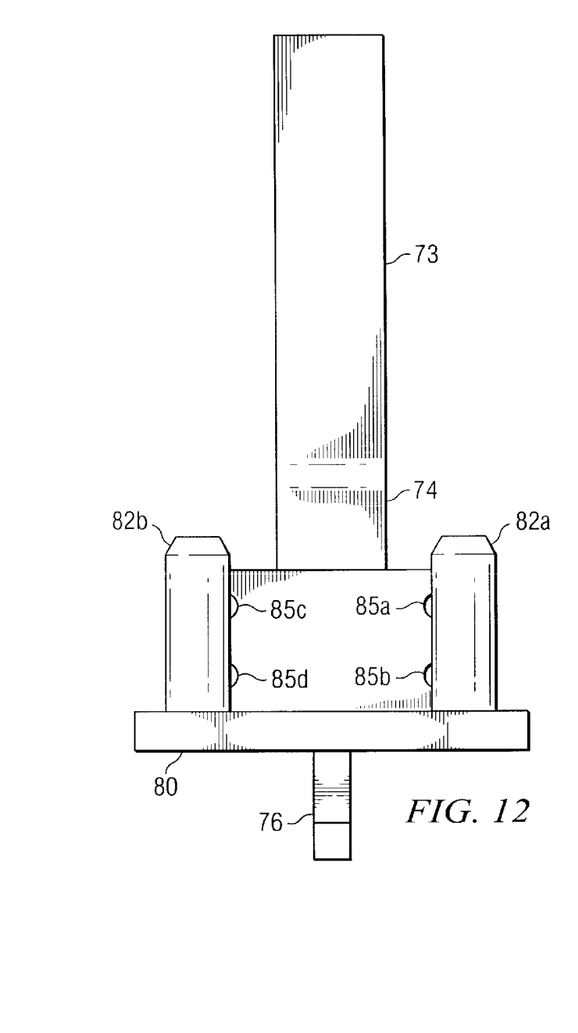
FIG. 12 is a second plan view of the alignment tool illustrated in FIG. 11.
Figure 13:
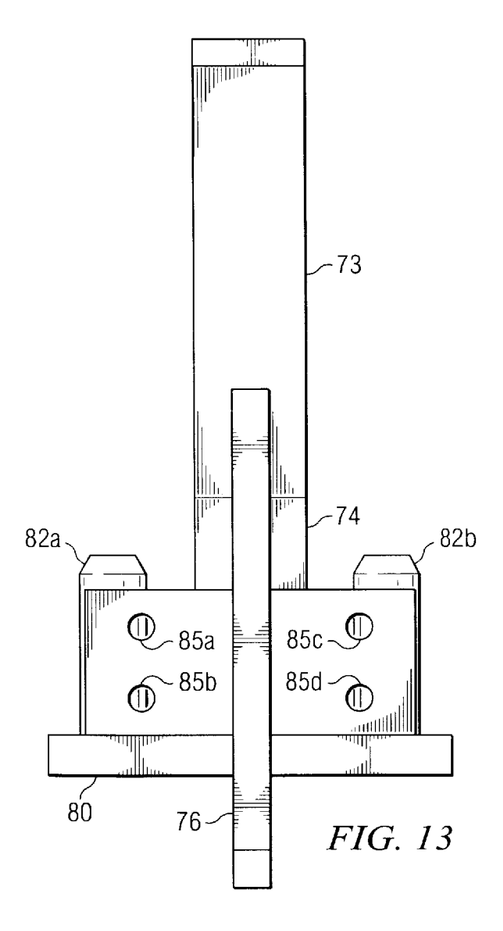
FIG. 13 is a third plan view of the alignment tool illustrated in FIG. 11.

Various other embodiments of the alignment tool may be envisioned. For example, FIGS. 11–13 show an embodiment of an alignment tool which is configured to be attached to a pipe flange using one or more pins similar to the alignment pins described above in conjunction with one or more set screws. This embodiment of the alignment tool is designed to be attached directly to a flange, rather than being secured between a flange and a wall of a buoyancy can.

Alignment tool 71 can again be considered to comprise an alignment guide and an attachment body. The alignment guide is formed by a bar which is bent to form a first, angled portion 73 and a second portion 74 which will parallel the axis of the flange. The alignment guide abuts a set screw plate 84 which will be positioned at the outer edge of the flange to which alignment tool 71 is attached. (While the alignment guide and the set screw plate are separate pieces in this embodiment, they may be formed from a single, T-shaped piece of metal in another embodiment.) Four set screws 85a–85d are screwed into threaded holes in set screw plate 84. Set screws 85 are positioned generally in alignment with pins 82.

The alignment guide and set screw plate 84 are connected to central plate 76. A pin plate 81 is also connected to central plate 76. Pin plate 81 is oriented so that it will be positioned on the back of the flange (i.e., the side opposite the mating face of the flange) when alignment tool 71 is installed on the flange. A pair of pins 82a and 82b are oriented so that they will be positioned in a pair of corresponding bolt holes in the flange when mounted. Because the alignment tool will be used on a pipe section which does not have a buoyancy can, pins 82 need not be removably attached to pin plate 80 (although they may be removable, if desired).

Figure 14:
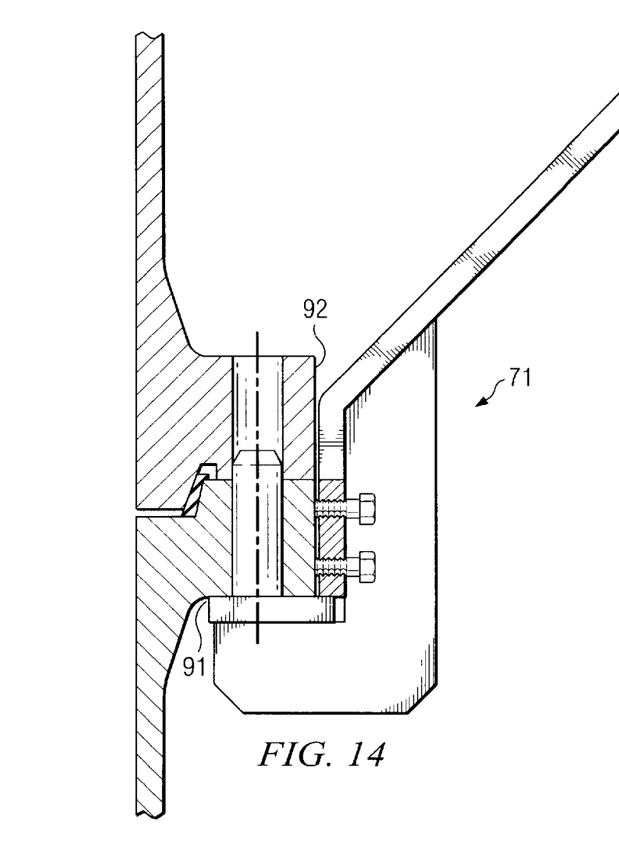
FIG. 14 is a plan view of the alignment tool illustrated in FIG. 11 installed on the flange of a pipe section.

Referring to FIG. 14, alignment tool 71 is shown installed on a flange 91. Alignment tool 71 is installed by loosening set screws 85, positioning the alignment tool with pins 82 inserted into corresponding bolt holes of flange 91, and tightening the set screws. Set screws 85 engage the outer edge of flange 91 to secure alignment tool 71 to the flange.

FIG. 14 shows pins 82 extending above the face of flange 91. Pins 82 therefore serve, not only as part of the attachment means for alignment tool 91, but also as alignment pins. That is, the pins provide an mechanism for aligning the bolt holes of the flanges (as described above in regard to other embodiments). In the illustrated embodiment, pins 82 are solid alignment pins similar to alignment pin 32 of FIGS. 3–5. In this case, both of the pins, rather than only one of them, extend above the face of the flange and align the flanges. (It should be noted that, although the embodiments of the alignment tool described above each include one or two alignment pins, other embodiments may use more or less pins, or may not use alignment pins at all.) In other set-screw embodiments of the alignment tool, spring-loaded, telescoping alignment pins of the type illustrated in FIGS. 8–10 can be used.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An alignment tool comprising:
an attachment body configured to be coupled to a first flange by one or more attachment pins configured to be inserted into corresponding bolt holes in the first flange; and
an alignment guide connected to the attachment body;
wherein when the attachment body is coupled to the first flange, the alignment guide extends outward from a first point near the periphery of the first flange at an angle from the axis of the first flange; and
wherein the attachment body is configured to be attached to the first flange by one or more set screws which oppose the one or more pins.

2. An alignment tool comprising:
an attachment body configured to be coupled to a first flange by one or more attachment pins configured to be inserted into corresponding bolt holes in the first flange;
an alignment guide connected to the attachment body; and
at least a first alignment pin coupled to the attachment body and configured to extend through a first bolt hole in the first flange, wherein the first alignment pin is configured to extend into a second bolt hole in a second flange when the second bolt hole is aligned with the first bolt hole
wherein when the attachment body is coupled to the first flange, the alignment guide extends outward from a first point near the periphery of the first flange at an angle from the axis of the first flange and
wherein the first alignment pin comprises a spring-loaded, telescoping portion, wherein when the second bolt hole is not aligned with the first bolt hole, the telescoping portion does not extend beyond the face of the first flange, and wherein when the second bolt hole is aligned with the first bolt hole, the telescoping portion extends into the second bolt hole.

3. An alignment tool comprising:
an attachment body configured to be coupled to a first flange; and
an alignment guide connected to the attachment body;
wherein when the attachment body is coupled to the first flange, the alignment guide extends outward from a first point near the periphery of the first flange at an angle from an axis of the first flange;
wherein the alignment guide comprises a first portion which is parallel to the axis of the first flange and a second portion which forms an angle of between 30 and 60 degrees with the axis; and
wherein the attachment body comprises
a central plate configured to fit between the first flange and a buoyancy can wall,
a base plate connected to a lower end of the central plate and configured to abut the buoyancy can wall, and
a pin plate connected to the central plate opposite the base plate, wherein the pin plate is configured to have one or more alignment pins removably threaded therethrough, the one or more alignment pins being configured to extend into corresponding bolt holes of the first flange, one of the one or more alignment pins being configured to extend beyond the face of the first flange for engaging a second flange.

4. A system comprising
a first flange
a plurality of alignment tools coupled to the first flange by one or more attachment pins configured to be inserted into one or more corresponding bolt holes in the first flange, wherein each of the plurality of alignment tools includes an alignment guide extending axially forward and radially outward from the periphery of the first fiange; and
a second flange configured to be coupled to the first flange;
wherein when the second flange is moved toward the first flange, the alignment guides constrain the movement of the second flange toward a position which is aligned with the first flange as the second flange becomes closer to the first flange, and
wherein each of the alignment tools comprises an alignment pin configured to extend through a corresponding one of the one or more bolt holes in the first flange, wherein a portion of the alignment pin extends beyond the corresponding bolt hole in the first flange for engaging a corresponding one of one or more bolt holes in the second flange.

5. The system of claim 4 wherein for each alignment tool, the alignment pin comprises a spring-loaded portion, wherein when the corresponding one of the one or more bolt holes in the second flange is not aligned with the corresponding one of the one or more bolt holes in the first flange, the spring-loaded portion does not extend beyond the face of the first flange, and wherein when the corresponding one of the one or more bolt holes in the second flange is aligned with the corresponding one of the one or more bolt holes in the first flange, the telescoping portion extends into the corresponding one of the one or more bolt holes in the second flange.

6. A method comprising:
attaching a plurality of alignment tools to a first flange by one or more attachment pins configured to be inserted into corresponding bolt holes in the first flange, wherein each of the plurality of alignment tools comprises an alignment guide which extends radially outward and axially forward from the first flange;
positioning a second flange between the alignment guides;
moving the second flange toward the first flange, wherein the alignment guides guide the second flange into an aligned position as the second flange approaches the first flange; and
when the second flange is positioned against the first flange, securing the second flange to the first flange,
wherein the first flange is connected to a pipe section having a buoyancy can installed thereon and wherein the one or more pins are removable and are configured to be inserted in bolt holes of the first flange, wherein installing the alignment tools comprises, for each alignment tool, removing the removable pins, inserting the alignment tool between the first flange and the buoyancy can, and re-installing the one or more pins in the alignment tool.

7. A method comprising:
attaching a plurality of alignment tools to a first flange by one or more attachment pins configured to be inserted into corresponding bolt holes in the first flange, wherein each of the plurality of alignment tools comprises an alignment guide which extends radially outward and axially forward from the first flange;
positioning a second flange between the alignment guides;
moving the second flange toward the first flange, wherein the alignment guides guide the second flange into an aligned position as the second flange approaches the first flange; and
when the second flange is positioned against the first flange, securing the second flange to the first flange,
wherein each alignment tool comprises one or more set screws opposing the pins, wherein installing the alignment tools comprises, for each alignment tool, loosening the one or more set screws, positioning the alignment tool at the periphery of the first flange with the one or more pins inserted into bolt holes of the first flange, and tightening the set screws to secure the alignment tool at the first flange.

8. A method comprising:
attaching a plurality of alignment tools to a first flange by one or more attachment pins configured to be inserted into corresponding bolt holes in the first flange, wherein each of the alignment tools comprises an alignment guide which extends radially outward and axially forward from the first flange and an alignment pin configured to extend through a bolt hole in the first flange, wherein a portion of the alignment pin extends beyond the bolt hole for engaging a bolt hole in the second flange;
positioning a second flange between the alignment guides;
moving the second flange toward the first flange, wherein the alignment guides guide the second flange into an aligned position as the second flange approaches the first flange; and
when the second flange is positioned against the first flange, securing the second flange to the first flange.

9. A method comprising:
attaching a plurality of alignment tools to a first flange by one or more attachment pins configured to be inserted into corresponding bolt holes in the first flange, wherein each of the plurality of alignment tools comprises an alignment guide which extends radially outward and axially forward from the first flange;
positioning a second flange between the alignment guides;
moving the second flange toward the first flange, wherein the alignment guides guide the second flange into an aligned position as the second flange approaches the first flange; and
when the second flange is positioned against the first flange, securing the second flange to the first flange;
wherein each of the alignment tools comprises an alignment pin configured to extend through a bolt hole in the first flange, wherein a portion of the alignment pin extends beyond the bolt hole for engaging a bolt hole in the second flange, and
wherein the alignment pin comprises a spring-loaded portion, wherein when the second bolt hole is not aligned with the first bolt hole, the spring-loaded portion does not extend beyond the face of the first flange, and wherein when the second bolt hole is aligned with the first bolt hole, the telescoping portion extends into the second bolt hole.

* * * * *